(12) United States Patent
Schulte (10) Patent No.: US 9,778,074 B2
(45) Date of Patent: Oct. 3, 2017

(54) PROCESS MEASUREMENT SYSTEM WITH VARIABLE AMPLITUDE SENSOR EXCITATION

(71) Applicant: Rosemount Inc., Chanhassen, MN (US)

(72) Inventor: John Paul Schulte, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 298 days.

(21) Appl. No.: 13/827,390

(22) Filed: Mar. 14, 2013

(65) Prior Publication Data

US 2014/0266259 A1 Sep. 18, 2014

(51) Int. Cl.
*G01R 35/00* (2006.01)
*G01D 5/24* (2006.01)

(52) U.S. Cl.
CPC ..................................... *G01D 5/24* (2013.01)

(58) Field of Classification Search
CPC ......... G01L 9/12; G01L 9/0075; G01L 19/02; G01L 1/2256; G01L 27/005; G01L 9/0072; H03M 3/43; H03M 3/438; H03M 3/384; H03M 3/04; H03M 3/458; H03M 3/46; G01D 5/24; G01D 5/2417; G01P 15/125; G01R 27/2605
USPC ....... 324/684, 519, 548, 658, 686, 665, 667, 324/672, 676, 679; 341/143
See application file for complete search history.

(56) References Cited

U.S. PATENT DOCUMENTS

| | | | |
|---|---|---|---|
| 5,083,091 A | | 1/1992 | Frick et al. |
| 5,134,401 A | * | 7/1992 | McCartney et al. ........... 341/143 |
| 5,150,120 A | * | 9/1992 | Yunus ..................... H03M 3/47 341/143 |
| 5,343,766 A | * | 9/1994 | Lee ............................ 73/862.61 |
| 5,454,266 A | * | 10/1995 | Chevroulet et al. ........ 73/514.18 |
| 5,541,600 A | * | 7/1996 | Blumenkrantz et al. ..... 341/139 |
| 5,637,802 A | | 6/1997 | Frick et al. |
| 6,040,793 A | | 3/2000 | Ferguson, Jr. et al. |
| 6,089,097 A | | 7/2000 | Frick et al. |
| 6,140,952 A | * | 10/2000 | Gaboury ....................... 341/143 |
| 6,295,875 B1 | | 10/2001 | Frick et al. |
| 6,509,746 B1 | | 1/2003 | Wang |

(Continued)

FOREIGN PATENT DOCUMENTS

| | | |
|---|---|---|
| EP | 2428774 A1 | 3/2012 |
| JP | 02015715 | 1/1990 |

(Continued)

OTHER PUBLICATIONS

International Searching Authority Patent Cooperation Treaty, International Search Report and Written Opinion, Jul. 1, 2014, 12 pages.

(Continued)

*Primary Examiner* — Tung X Nguyen
*Assistant Examiner* — Lee Rodak
(74) *Attorney, Agent, or Firm* — Kinney & Lange, P.A.

(57) ABSTRACT

A process measurement system includes a sensor for producing a sensor signal as a function of a process parameter and a measurement circuit that converts the sensor signal to measurement data. A control circuit controls the amplitude of the sensor excitation to maximize signal strength over the entire operating ratio range of the sensor. This enhances resolution and noise rejection of the measurement circuit.

32 Claims, 6 Drawing Sheets

(56) References Cited

U.S. PATENT DOCUMENTS

| | | | |
|---|---|---|---|
| 6,516,672 B2 | 2/2003 | Wang | |
| 6,594,613 B1 * | 7/2003 | Ley | G01D 3/032 |
| | | | 327/553 |
| 6,834,258 B2 | 12/2004 | Schulte et al. | |
| 6,970,126 B1 * | 11/2005 | O'Dowd et al. | 341/172 |
| 7,145,350 B2 * | 12/2006 | Mellert et al. | 324/678 |
| 8,319,550 B2 * | 11/2012 | Prasad et al. | 330/9 |
| 2002/0178827 A1 | 12/2002 | Wang | |
| 2007/0171107 A1 * | 7/2007 | Wang | G01L 9/12 |
| | | | 341/143 |
| 2009/0196374 A1 * | 8/2009 | Schulte | G01D 3/0365 |
| | | | 375/296 |
| 2012/0043973 A1 | 2/2012 | Kremin | |
| 2012/0274340 A1 * | 11/2012 | Yang | G01R 17/02 |
| | | | 324/680 |
| 2013/0049776 A1 * | 2/2013 | Petkov | G01D 5/24 |
| | | | 324/679 |
| 2013/0057301 A1 * | 3/2013 | Balachandran | G01P 15/0802 |
| | | | 324/679 |

FOREIGN PATENT DOCUMENTS

| | | |
|---|---|---|
| JP | H07146314 A | 6/1995 |
| WO | 2006130828 A2 | 12/2006 |
| WO | 2006130828 A3 | 12/2006 |

OTHER PUBLICATIONS

Extended European Search Report for European Patent Application No. 14775498.0, dated Sep. 22, 2016, 7 pages.

First Chinese Office Action, for Chinese Patent Application No. 201310329089.1, dated Mar. 28, 2017, 16 pages.

Japanese Office Action, for Japanese Patent Application No. 2016-501837, dated Jul. 19, 2017, 12 pages.

* cited by examiner

PROCESS MEASUREMENT SYSTEM WITH VARIABLE AMPLITUDE SENSOR EXCITATION

BACKGROUND

The present invention relates to a process measurement system. In particular, the present invention relates to enhancement of resolution and noise rejection of measurement circuitry that converts an analog sensor signal into digital measurement data.

A process transmitter is a device that is used to monitor the operation of an industrial process. The process transmitter includes a sensor that responds to a measured process variable or parameter with a sensing element and converts the process parameter to a standardized transmission signal that is a function of the measured parameter. Examples of process parameters include pressure, temperature, flow, conductivity, and pH.

One such transmitter is described in U.S. Pat. No. 6,295,875 by Roger L. Frick and David A. Broden. This transmitter employs a capacitive sensor having a deflectable sensing diaphragm and three or more capacitor electrodes which form separate capacitive sensing elements with the diaphragm. Two of the capacitor elements are primary sensing capacitors that are arranged differentially so that the capacitances of the primary sensing capacitors change oppositely in proportion to the process variable. The third and fourth capacitor elements are compensation capacitors that provide signals representing offset errors or hysteresis associated with the primary capacitors. As pressure is applied to one or both sides of the diaphragm, the diaphragm deflects. The deflection of the diaphragm can be detected by measuring a change in a ratio of electrical capacitance related to the deflection. This capacitance ratio is converted into a digital format using an analog-to-digital converter.

Another type of transmitter is described in U.S. Pat. Nos. 5,637,802 and 6,089,097 by Roger L. Frick, Bennett L. Louwagie and Adrian C. Toy. The transmitter described in these two patents uses two absolute pressure sensors to measure differential pressure as well as two absolute pressures, with high resolution on the differential pressure measurement.

One particularly advantageous form of analog-to-digital converter uses a sigma-delta (or delta-sigma) modulator. The use of sigma-delta modulators in transmitters is described in U.S. Pat. No. 5,083,091 by Roger L. Frick and John P. Schulte; U.S. Pat. No. 6,140,952 by Michael Gaboury; U.S. Pat. No. 6,509,746 by Rongtai Wang; and U.S. Pat. No. 6,516,672 by Rongtai Wang.

In a transmitter having a sigma-delta modulator acting as a capacitance-to-digital (CD) converter, an excitation circuit provides charge packets to the capacitive sensor elements. The sensor elements are charged by an amount based on the capacitance value of that capacitive element. The charges are transferred to an integrator/amplifier of the sigma-delta modulator to produce a one-bit binary output that is a function of a capacitance ratio.

The basic function of the CD modulator is to convert the capacitance ratio into a PDM (pulse density modulation) signal. For a CD modulator using sigma-delta architecture, the actual process involves converting a charge ratio into a PDM signal. Under normal operating conditions, since the charge is proportional to the capacitance, the charge ratio is equal to the capacitance ratio.

SUMMARY

A process measurement system includes a sensor for producing a sensor signal as a function of process parameter, a measurement circuit for converting the sensor signal to measurement data, and a control circuit that controls magnitude of the sensor signal as a function of the measurement data so that full use is made of a dynamic range of the measurement circuit.

In another embodiment, process and measurement system includes a sensor for producing a sensor signal as a function of a process parameter, a measurement circuit for converting the sensor signal to measurement data, and a control circuit that maximizes signal strength of the sensor signal over an entire operating range of the sensor. The control circuit thus enhances resolution and rejection of noise by the measurement circuit.

In another embodiment, a process measurement system includes a sensor for producing a sensor signal as a function of the process parameter, an analog-to-digital converter for converting the sensor signal to measurement data, and a control circuit for controlling amplitude of excitation of the sensor as a function of a signal from the analog-to-digital converter.

A method of producing measurement data based upon a process parameter excites a sensor to produce a sensor signal representative of a sensor value that is a function of the process parameter. The sensor signal is converted to measurement data. Amplitude of excitation of the sensor is varied as a function of the sensor signal, so that the excitation is increased when the sensor signal is decreased.

DETAILED DESCRIPTION

Resolution and noise rejection of analog-to-digital (A/D) circuits in measurement instrumentation are limited by sensor signal strength. Generally, performance improvements are realized when signal strength is increased. The present invention maximizes signal strength over the entire operational range of a sensor by controlling the amplitude of the sensor excitation according to an input condition.

In the following description, the variable sensor amplitude excitation of the present invention will be discussed in the context of a capacitance differential pressure sensor. It should be understood, however, that the invention is also applicable to other types of sensors.

Capacitance differential pressure sensors manufactured by Rosemount Inc. feature signal conditioning that makes use of a switched capacitor sigma delta A/D converter.

Examples of this type of signal conditioning can be found in the US patents described in the Background of the Invention, all of which are assigned to Rosemount Inc., and are hereby incorporated by reference.

The fundamental signal in these types of sigma delta A/D converters is a charge packet derived from the capacitance sensor. The charge packets delivered from the sensor are integrated in a sigma delta modulator based on a switched capacitor charge integrator.

Figure 1:
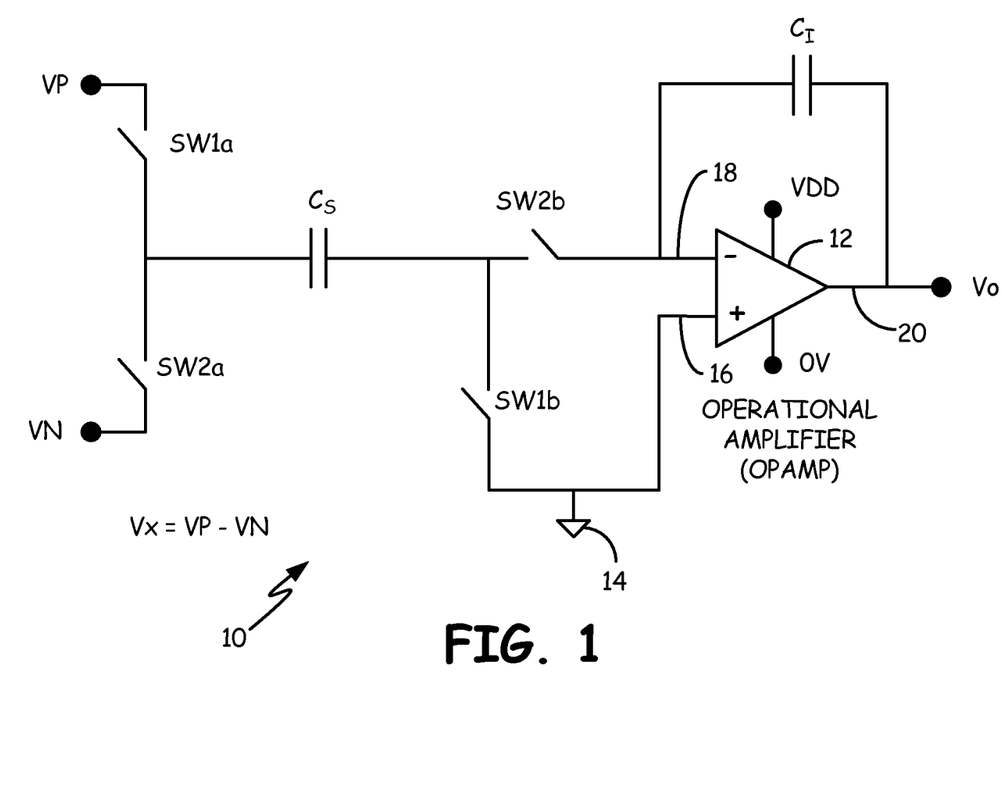
FIG. 1 is a simplified electrical schematic of a switched capacitor charge integrator.

A simplified schematic of a switched capacitor charge integrator used within a sigma delta modulator is shown in FIG. 1. In this simplified schematic, a single sensor capacitor is shown. It is typical, however, for a capacitance pressure sensor used with a sigma delta converter to have multiple sensors and multiple capacitors.

Switched capacitor charge integrator 10 shown in FIG. 1 includes sensing capacitor CS, switches SW1a, SW1b, SW2a, and SW2b, integrating capacitor CI, and operational amplifier (opamp) 12. Switch SW1a is connected between DC voltage VP and capacitor CS. Switch SW2a is connected between DC voltage VN and capacitor CS. Switch SW1b is connected between capacitor CS and the non-inverting (plus) input 16 of opamp 12, which is also connected to ground 14. Switch SW2b is connected between capacitor CS and the inverting (minus) input 18 of opamp 12. Capacitor CI is connected between output 20 and inverting input 18 of opamp 12. Output voltage Vo appears at output 20 of opamp 12.

The processing of a charge packet from sensor capacitor Cs takes place in two phases. During phase 1, switches SW1a and SW1b are closed (and switches SW2a and SW2b are open), which puts a charge on sensor capacitor Cs:

$$Q_{S1}=C_S*VP$$

During phase 2 switches SW2a and SW2b are closed (and switches SW1a and SW1b are open), which puts a charge on sensor capacitor Cs:

$$Q_{S2}=C_S*VN$$

VP and VN are fixed DC voltages that set the level of excitation voltage Vx to sensor Cs. The net change in charge is $(Q_{S1}-Q_{S2})=C_S*(VP-VN)=C_S*V_X$ where $V_X=VP-VN$. This charge is transferred to the integrating capacitor $C_I$. The output voltage of the opamp changes by an amount $$\Delta V_O=V_X*C_X/C_I.$$

In the design of this type of system, it is important to limit output voltage Vo of opamp 12 to within the limits of the amplifier: $0<V_O<VDD$; where 0V and VDD are the supply rails for opamp 12. If this is not done, opamp 12 will not be able to maintain the charge relations described above and the operation of the sigma delta A/D converter will be compromised. The system designer chooses excitation voltage $V_X$ and integrating capacitor $C_I$ to ensure that output Vo of opamp 12 stays within the supply rails. At the same time, it is desired to maximize the excitation level to obtain the best performance of the system.

When setting the system design parameters, the designer must take into account the maximum value of $C_S$ that can be encountered during normal operation. For example, for Rosemount differential pressure (DP) sensors, that maximum value is set by specification at 100 pF. Then an appropriate value for $V_X/C_I$ can be determined. Excitation voltage $V_X$ is constrained based on the maximum value of sensor capacitor $C_S$, however, in practice the sensor capacitor is always less than 100 pF. In fact, at zero DP the typical sensor capacitors are closer to 25 pF, 4 times smaller than the maximum value. This means that at zero DP where customers are most interested in premium performance, the signal level is sub-optimal.

The concept described by this disclosure is to allow the excitation voltage $V_X$ to become a variable instead of being fixed. This allows higher performance to be achieved by using a larger excitation voltage for a zero, or near zero DP input condition. For low values of sensor capacitance, $V_X$ is set to a larger value; and for high values of sensor capacitance, $V_X$ is set to a smaller value. The goal is to keep the signal charge ($C_S*V_X$) at a substantially constant level over the entire operating range of the sensor with the goal of maximizing signal-to-noise ratio at all input conditions.

This adjustment of excitation voltage is effective for systems that have a ratiometric measurement, i.e., where a capacitance ratio is converted to a charge ratio, which is then converted to a PDM signal. With ratiometric measurements, digital measurement is insensitive to magnitude of the excitation voltage. The digital output is minimally affected by altering the excitation voltage, and whatever effect does exist can be compensated out of the system using standard characterize/verify procedures.

Figure 2:
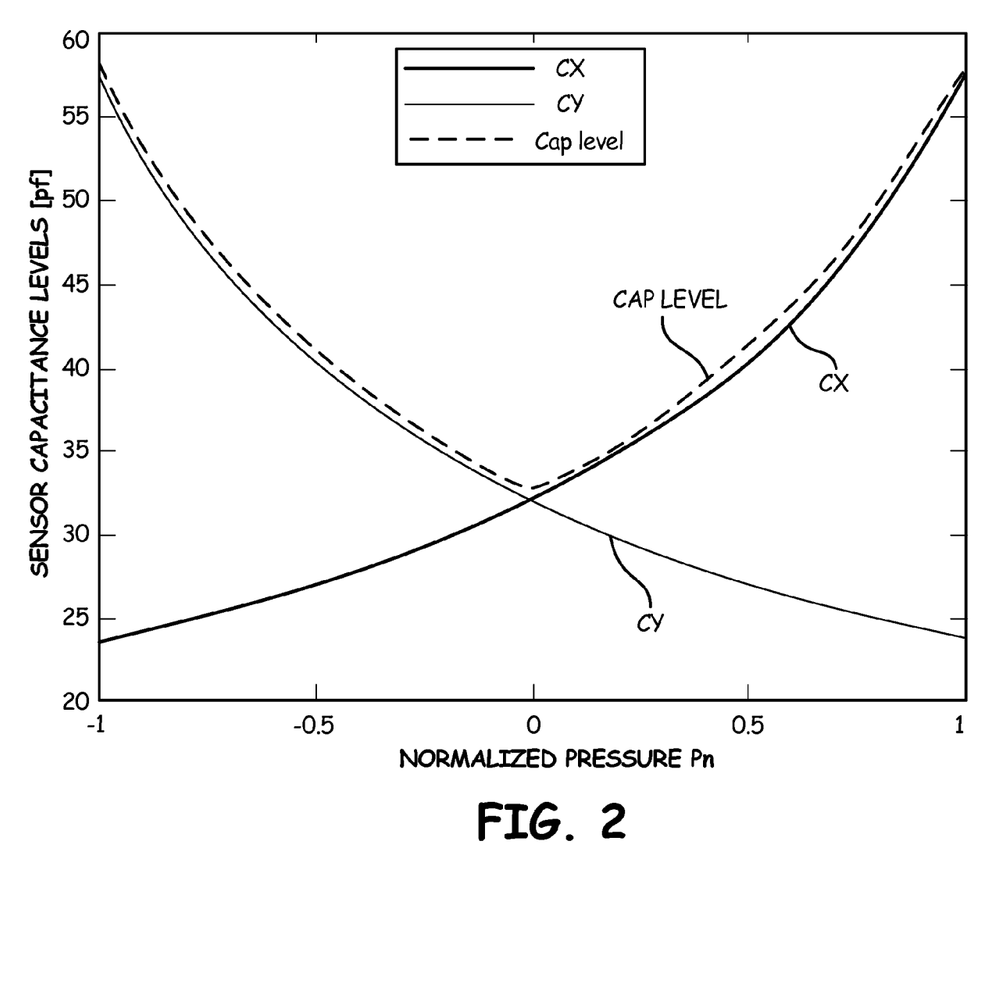
FIG. 2 is a graph of sensor capacitance level versus normalized pressure of a capacitance differential pressure sensor.

A typical relationship between sensor capacitance and pressure for a capacitance DP pressure sensor is given in FIG. 2. CX is the high side capacitance of the DP sensor; it increases with normalized pressure Pn. CY is the low side capacitance of the DP sensor; it decreases with Pn. The capacitance level (cap level) is the maximum of the two sensor capacitors. It can be seen that the capacitance level is at its minimum when pressure is at zero DP. The capacitance level at full scale pressure is close to two times the capacitance level at zero pressure, this justifies using an excitation voltage that doubles at zero DP compared to the excitation voltage at full scale pressure.

Figure 3:
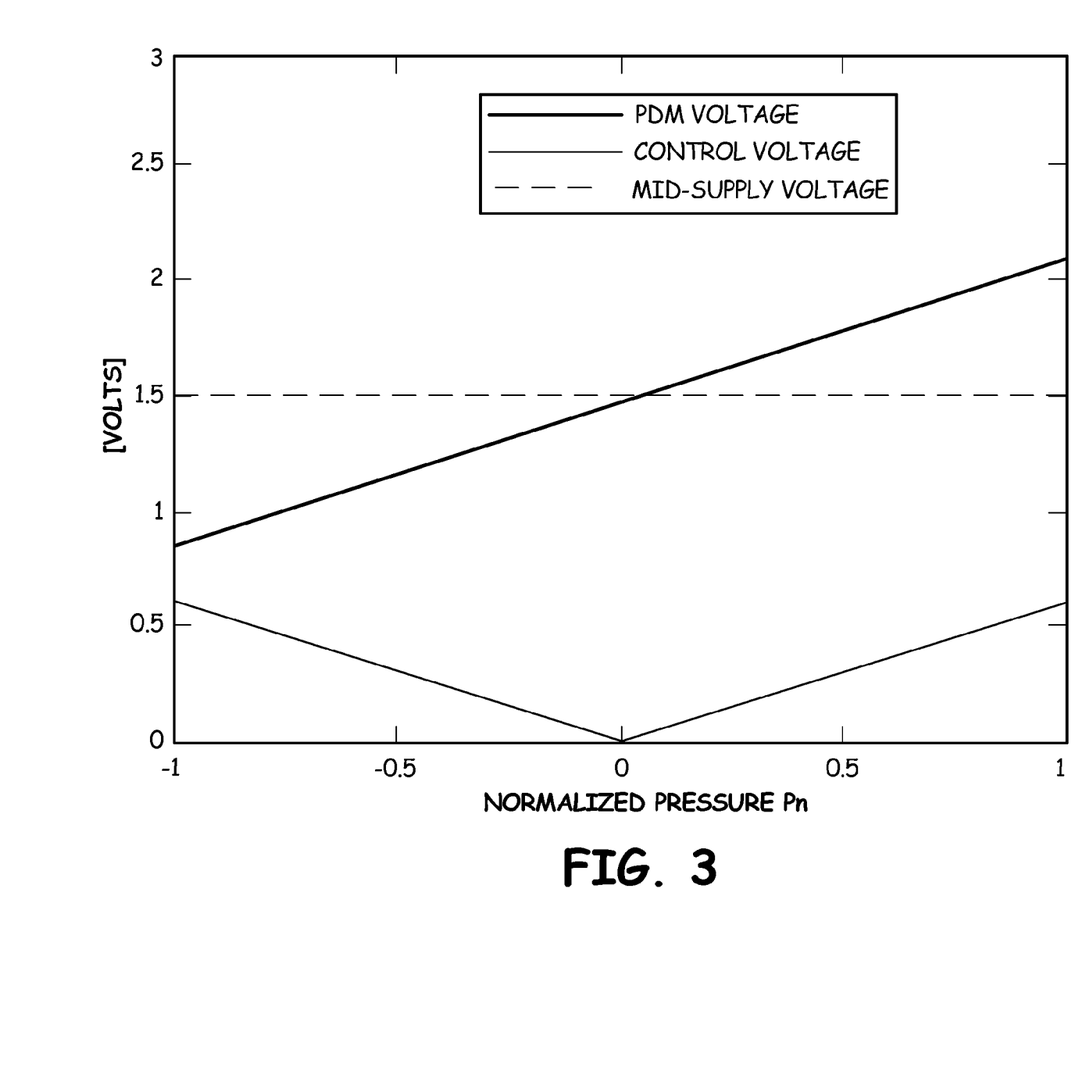
FIG. 3 is a graph of pulse density modulation (PDM) and control voltage versus normalized pressure of a capacitance differential pressure sensor with Sigma Delta analog-to-digital conversion.
Figure 5:
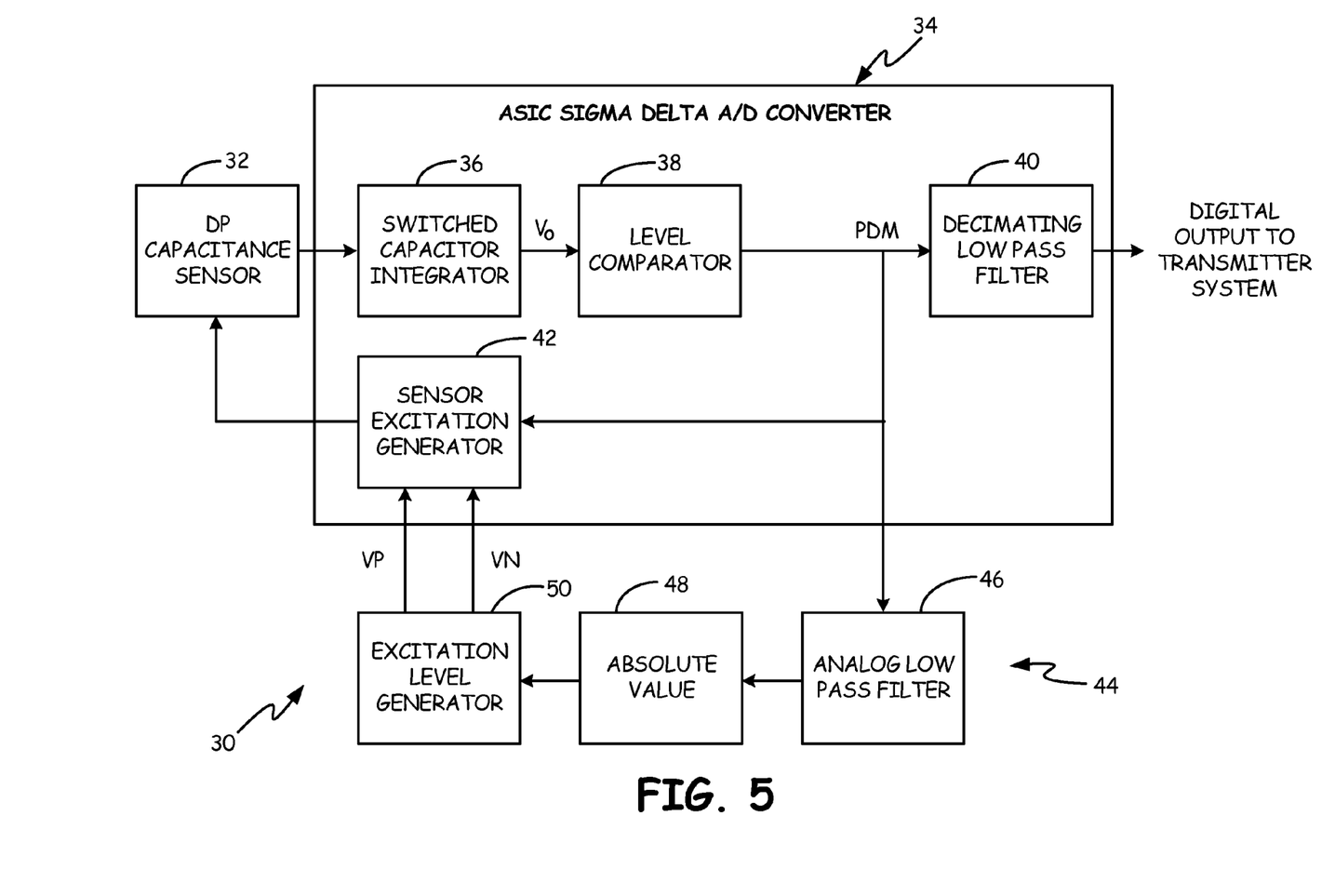
FIG. 5 is a block diagram of an embodiment of a capacitance sensor system with variable amplitude excitation of the sensor.

Sigma delta A/D converters such as those used in capacitance DP pressure transmitters provide for a convenient signal to use for controlling the excitation level. The sigma delta converter produces a pulse density modulated (PDM) signal that is the digital bit stream containing the digitized sensor signal. The digitized sensor signal is low pass filtered and decimated as shown in FIG. 5. The PDM signal is also an analog signal that can be low pass filtered to extract a DC representation (PDM voltage) of the sensor signal (see FIG. 3). Note that if the absolute value of the signal is taken with reference to mid-supply, a suitable control signal is obtained (also shown in FIG. 3). In FIG. 3, the supply voltage is 3V, and mid supply is 1.5V.

Figure 4:
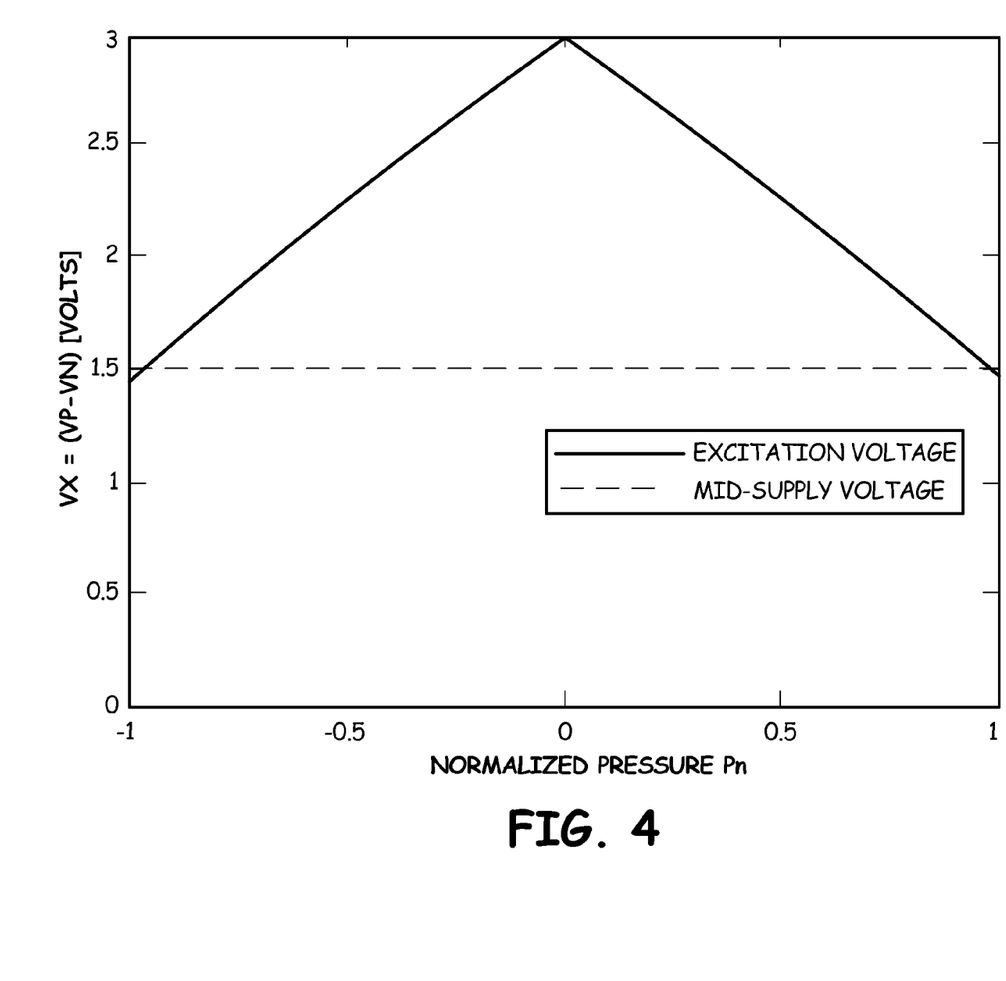
FIG. 4 is a graph showing variable amplitude excitation VX of a capacitance differential pressure sensor as a function of normalized pressure, with maximum excitation at zero differential pressure.

The final step is to convert the control signal to an excitation level. In one embodiment, the nominal fixed excitation is half the analog supply. The excitation voltage (Vx=VP-VN) can be set to the entire analog supply at zero DP, and be reduced to half the analog supply at full scale pressure as shown in FIG. 4. The approximate expression for Vx is given in the following equation:

$$Vx=VDD-2.5*Vcntl$$

where Vcntl is the control voltage in FIG. 3

The fixed excitation scheme is represented by the dashed line at 1.5V in FIG. 4. The variable excitation scheme is represented by the solid line. The variable excitation reaches its maximum when DP is zero, and regresses to ½ VDD at full scale pressure. Thus, the excitation voltage is increased when DP is decreased.

FIG. 5 is a block diagram of differential pressure (DP) capacitance transmitter 30 which features variable amplitude excitation of DP capacitance sensor 32. Transmitter 30 includes sensor 32, sigma delta A/D converter 34 (which includes switched capacitor integrator 36, level comparator 38, decimating low pass filter 40, and sensor excitation generator 42) together with variable excitation control 44 (which includes analog low pass filter 46, absolute value circuit 48, and excitation level generator 50).

Sigma delta A/D converter 34 is, in the embodiment shown, an application specific integrated circuit (ASIC) that includes the circuitry to perform the functions of switched capacitor integrator 36, level comparator 38, decimating low pass filter 40, and sensor excitation generator 42. The input to converter 34 is received from DP capacitance sensor 32, and is in the form of charge packets produced by sensor 32 in response to sensor excitation voltages supplied by sensor excitation generator 42.

Switched capacitor integrator 36 provides output voltage Vo to level comparator 38. The output of level comparator 38 is a pulse density modulated (PDM) signal that is supplied to decimating low pass filter 40, sensor excitation generator 42 and analog low pass filter 46 of variable excitation control 44. Decimating low pass filter 40 converts the PDM signal to a digital output, which is supplied to the transmitter system of process transmitter 30. The digital output from decimating low pass filter 40 represents raw data that may be groomed and then transmitted from transmitter 30 to the control room over a two wired control loop, a wired network, or a wireless network.

The PDM signal is an input to sensor excitation generator 42. Changes of state of the PDM signal cause sensor excitation generator 42 to change the excitation voltage between voltage VP and voltage VN. The selected voltage VP or VN is applied as excitation to DP capacitance sensor 32.

Excitation control 44 uses the PDM signal to set the excitation level (VP−VN) that is provided to sensor excitation generator 42. The PDM signal is filtered by analog low pass filter 46 to convert the PDM signal (a digital bit stream representation of the capacitance ratio) to an analog representation. Absolute value circuit 48 converts the output of filter 46 to an absolute value control signal. The control signal is used by excitation level generator to set the levels of VP and VN.

The PDM signal is function of the capacitance levels of DP capacitance sensor 32, and is for the most part independent the excitation (VP−VN). This allows the excitation to be changed without seriously affecting the measured signal, other than improving the signal-to-noise ratio. Variable excitation control 44 adjusts the excitation provided by sensor excitation generator 42 to sensor 32 so that excitation is highest when the differential pressure is at zero. This is illustrated, for example, by FIGS. 2-4 discussed above.

Sigma delta A/D converter 34 may, for example, be any of the current C/D ASIC's used by Rosemount Inc. in its capacitance sensor process transmitter. The excitation level control block uses the PDM signal to set the excitation level, and this is fed back into the A/D excitation control block.

With respect to FIG. 5, all the operations described relative to the generation of the variable excitation levels are well known in the art of analog circuit design. For effective implementation, the design must be engineered to set all the levels and rates (e.g. slopes and levels in FIG. 4) to balance the constraints of the measurement electronics with the performance goals of the system. Benefits in the areas of A/D resolution and EMC noise rejection can be expected.

Figure 6:
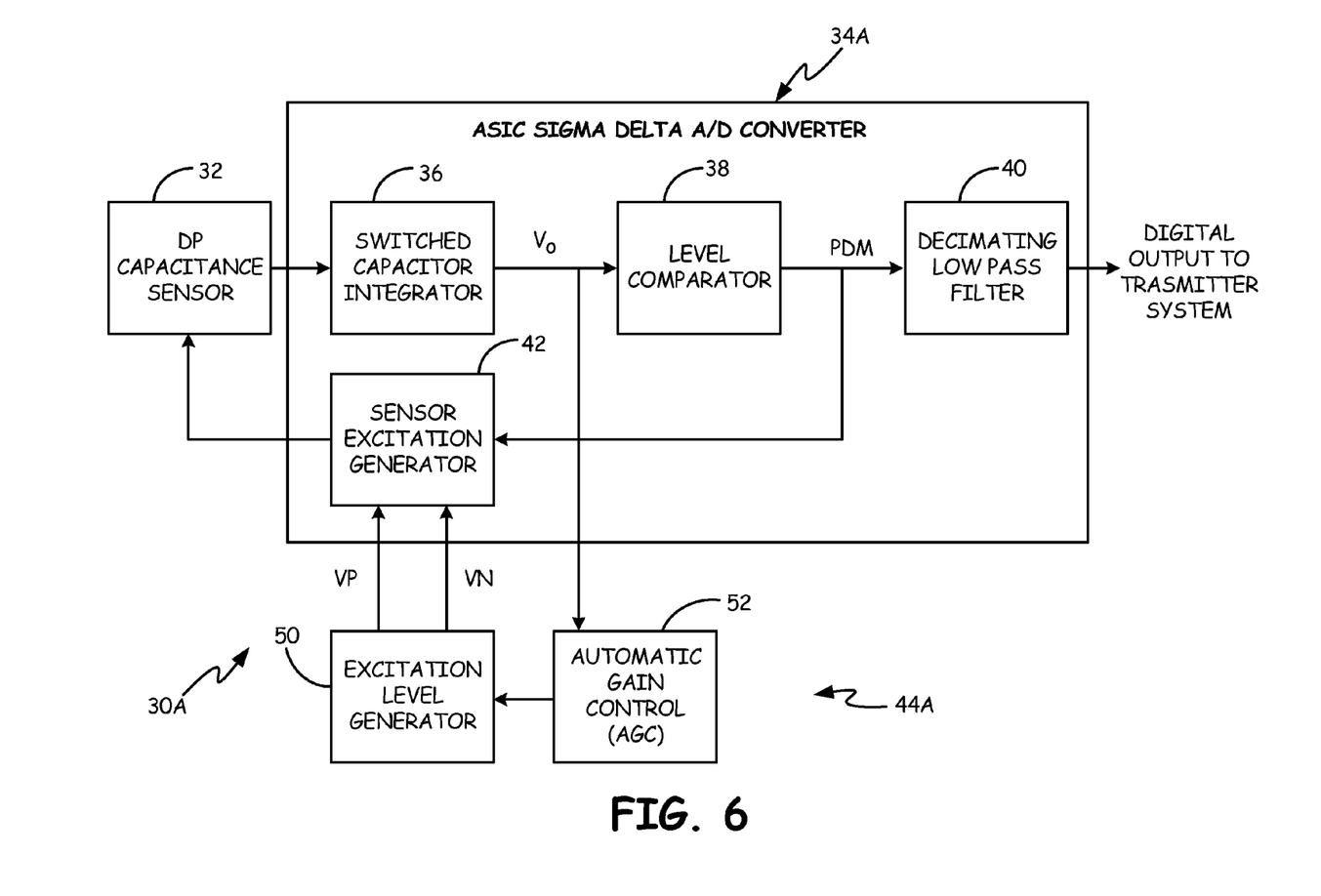
FIG. 6 is a block diagram of another embodiment of a capacitance sensor system with variable amplitude excitation of the sensor.

FIG. 6 shows DP pressure transmitter 30A, which is another embodiment in which variable excitation control is used. Transmitter 30A includes DP capacitance sensor 32, sigma delta A/D converter 34A (which includes switched capacitor integrator 36, level comparator 38, decimating low pass filter 40, and sensor excitation generator 42) and variable excitation control 44A, which includes excitation level generator 50 and automatic gain control 52.

Variable excitation control 44A uses the output voltage Vo of switched capacitor integrator 36 rather than the PDM signal to generate a control signal to excitation level generator 50. Vo is supplied as an input to automatic gain control (AGC) 52, the output of AGC 52 is supplied to excitation level generator 50 as control signal to determine the excitation level of DP capacitance sensor 32 by controlling the levels of voltage in VP and VN. Excitation is set for the largest level possible while avoiding saturation issues in switched capacitor integrator 36.

The invention has been described using examples of capacitance differential pressure sensors where the capacitance level is minimum at zero, and increases as pressure goes from zero to full scale, and also increases as pressure goes from zero to minus full scale (FIG. 2). This invention is equally applicable to capacitance sensors that measure absolute pressure, where capacitance is minimum at zero pressure, and increases with pressure. In this case, there is no negative pressure, and there is no need for the absolute value circuit as shown in FIG. 5.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process measurement system comprising:
    a sensor for producing a sensor signal comprising a high-side signal and a low-side signal, each of the high-side signal and the low-side signal being a function of a process parameter and an excitation voltage selectively coupled to the sensor in two phases, the excitation voltage being equal to a voltage difference between a first voltage coupled to the sensor during a first phase and a second voltage coupled to the sensor during a second phase;
    a ratiometric measurement circuit for converting the sensor signal to digital measurement data using a ratio of the high-side signal to the low-side signal, the ratio being indicative of a value of the process parameter and substantially insensitive to the excitation voltage; and
    a control circuit for varying a magnitude of the excitation voltage selectively coupled to the sensor based on an absolute value of the process parameter as indicated by the measurement data, wherein the control circuit further adjusts the magnitude to a maximum when the process parameter is zero and decreases the magnitude as the absolute value of the process parameter increases so that substantially full use is made of a dynamic range of the ratiometric measurement circuit.

2. The system of claim 1, wherein the sensor comprises a capacitance sensor.

3. The system of claim 2, wherein the capacitance sensor is a differential pressure capacitance sensor.

4. The system of claim 3, wherein the control circuit controls the excitation voltage selectively coupled to the differential pressure capacitance sensor so that a magnitude of the excitation voltage is increased when a magnitude of differential pressure is decreased.

5. The system of claim 1, wherein the ratiometric measurement circuit comprises a sigma delta analog-to-digital (A/D) converter.

6. The system of claim 5, wherein the sigma delta A/D converter comprises:
   a switched capacitor integrator having an input connected to the sensor and an output at which an integrator output voltage is provided;
   a level detector having an input connected to the output of the switched capacitor integrator and an output at which a pulse density modulation (PDM) signal is provided; and
   a decimating low-pass filter having an input connected to the output of the level detector and an output at which the digital measurement data is provided.

7. The system of claim 6, wherein the measurement data comprises the PDM signal.

8. The system of claim 7, wherein the control circuit comprises:
   a low pass filter that filters the PDM signal to produce a digital DC level of the PDM signal;
   an absolute value circuit that produces an excitation control signal as a function of the digital DC level of the PDM signal; and
   an excitation level generator that provides the excitation voltage to the sensor as a function of the excitation control signal.

9. The system of claim 6, wherein the measurement data comprises the integrator output voltage.

10. The system of claim 9, wherein the control circuit comprises:
    an automatic gain control circuit that produces an excitation control signal as a function of the integrator output voltage; and
    an excitation level generator that provides the excitation voltage selectively coupled to the sensor as a function of the excitation control signal.

11. A process measurement system comprising:
    a sensor comprising two capacitor elements arranged differentially so that the capacitances of the capacitor elements change oppositely in proportion to the process variable and change proportionally to an excitation voltage selectively coupled to the sensor in two phases, the excitation voltage being equal to a voltage difference between a first voltage coupled to the sensor during a first phase and a second voltage coupled to the sensor during a second phase, each capacitance configured to produce a sensor signal as a first function of a product of a process parameter and the excitation voltage;
    a ratiometric measurement circuit for converting the sensor signals of the capacitor elements to digital measurement data using a ratio of a high-side signal to a low-side signal, the ratio being a function of a ratio of the signals of the capacitor elements, the ratio being substantially insensitive to the excitation voltage; and
    a control circuit for varying a magnitude of the excitation voltage based on an absolute value of the process parameter as indicated by the digital measurement data, wherein the control circuit further adjusts the magnitude to a maximum when the process parameter is zero and decreases the magnitude as the absolute value of the process parameter increases so that substantially full use is made of a dynamic range of the measurement circuit.

12. The system of claim 11, wherein the control circuit controls the selective coupling of the sensor to the excitation voltage.

13. The system of claim 11, wherein the sensor is a differential pressure capacitance sensor.

14. The system of claim 13, wherein the control circuit controls the excitation voltage of the differential pressure capacitance sensor so that a magnitude of the excitation voltage is increased when a magnitude of differential pressure is decreased.

15. The system of claim 11, wherein the ratiometric measurement circuit comprises a sigma delta analog-to-digital (A/D) converter.

16. The system of claim 15, wherein the sigma delta A/D converter comprises:
    a switched capacitor integrator having an input connected to the sensor and an output at which an integrator output voltage is provided;
    a level detector having an input connected to the output of the switched capacitor integrator and an output at which a pulse density modulation (PDM) signal is provided; and
    a decimating low-pass filter having an input connected to the output of the level detector and an output at which the digital measurement data is provided.

17. The system of claim 16, wherein the digital measurement data comprises the PDM signal.

18. The system of claim 17, wherein the control circuit comprises:
    a low pass filter that filters the PDM signal to produce a digital DC level of the PDM signal; and
    an absolute value circuit that produces an excitation control signal as a function of the digital DC level of the PDM signal
    an excitation level generator that provides the excitation voltage to the sensor as a function of the excitation control signal.

19. The system of claim 16, wherein the digital measurement data comprises the integrator output voltage.

20. The system of claim 19, wherein the control circuit comprises:
    an automatic gain control circuit that produces an excitation control signal as a function of the integrator output voltage; and
    an excitation level generator that controls the excitation voltage.

21. A process measurement system comprising:
    a sensor for producing a sensor signal comprising a high-side signal and a low-side signal, each of the high-side signal and the low-side signals being a function of a process parameter and an excitation voltage selectively coupled to the sensor in two phases, the excitation voltage being equal to a voltage difference between a first voltage coupled to the sensor during a first phase and a second voltage coupled to the sensor during a second phase;
    an analog-to-digital (A/D) converter for ratiometrically converting the sensor signal to measurement data using a ratio of the high-side signal to the low-side signal, the ratio being indicative of a value of the process parameter and substantially insensitive to the excitation voltage; and
    a control circuit for varying a magnitude of the excitation voltage based on an absolute value of the process parameter as indicated by the measurement data from the A/D converter, wherein the control circuit adjusts the magnitude to a maximum when the process parameter is zero and decreases the magnitude as the absolute value of the process parameter increases.

22. The system of claim 21, wherein the control circuit controls the selective coupling of the sensor to the excitation voltage.

23. The system of claim 21, wherein the sensor is a differential pressure capacitance sensor.

24. The system of claim 23, wherein the control circuit controls the magnitude of the excitation voltage of the differential pressure capacitance sensor so that the magnitude of the excitation voltage is increased when a magnitude of differential pressure is decreased.

25. The system of claim 21, wherein the A/D converter comprises:
a switched capacitor integrator having an input connected to the sensor and an output at which an integrator output voltage is provided;
a level detector having an input connected to the output of the switched capacitor integrator and an output at which a pulse density modulation (PDM) signal is provided; and
a decimating low-pass filter having an input connected to the output of the level detector and an output at which the measurement data is provided.

26. The system of claim 25, wherein the measurement data comprises the PDM signal.

27. The system of claim 26, wherein the control circuit comprises:
a low pass filter that filters the PDM signal to produce a digital DC level of the PDM signal;
an absolute value circuit that produces an excitation control signal as a function of the digital DC level of the PDM signal; and
an excitation level generator that provides the excitation voltage to the sensor as a function of the excitation control signal.

28. The system of claim 25, wherein the measurement data comprises the integrator output voltage.

29. The system of claim 28, wherein the control circuit comprises:
an automatic gain control circuit that produces an excitation control signal as a function of the integrator output voltage; and
an excitation level generator that provides the excitation voltage to the sensor as a function of the excitation control signal.

30. A method of producing measurement data based upon a process parameter, the method comprising:
exciting a sensor with an excitation voltage to produce a sensor signal representative of a sensor value producing a sensor signal comprising a high-side signal and a low-side signal, each of the high-side signal and the low-side signal being a function of the process parameter and the excitation voltage, the excitation voltage exciting the sensor in two phases, the excitation voltage being equal to a voltage difference between a first voltage exciting the sensor during a first phase and a second voltage exciting the sensor during a second phase;
ratiometrically converting the sensor signal to measurement data using a ratio of the high-side signal to the low-side signal, the ratio being indicative of a value of the process parameter and substantially insensitive to the excitation voltage; and
varying a magnitude of the excitation voltage of the sensor based on an absolute value of the process parameter so that a magnitude of the excitation voltage has a maximum when the process parameter is zero and decreases as the absolute value of the process parameter increases.

31. The method of claim 30, wherein the sensor comprises a capacitance sensor and the sensor value is a charge on a capacitance.

32. The system of claim 30, wherein converting the sensor to measurement data is performed by a sigma delta analog-to-digital (A/D) converter.

* * * * *